United States Patent [19]
Kupelian

[11] 3,874,872

[45] Apr. 1, 1975

[54] PROCESS FOR INCREASING SUGAR YIELD IN SUGAR CANE

[75] Inventor: Robert Howard Kupelian, Yardley, Pa.

[73] Assignee: American Cyanamid Company, Stamford, Conn.

[22] Filed: Mar. 2, 1973

[21] Appl. No.: 337,327

[52] U.S. Cl. .................................................. 71/86
[51] Int. Cl. ............................................. A01n 9/36
[58] Field of Search ....................... 71/86, 124, 122

[56] References Cited
UNITED STATES PATENTS

| | | | |
|---|---|---|---|
| 3,556,762 | 1/1971 | Hamm | 71/86 |
| 3,619,166 | 11/1971 | Quebedeaux, Jr. | 71/86 |

*Primary Examiner*—James O. Thomas, Jr.
*Attorney, Agent, or Firm*—Harry H. Kline

[57] ABSTRACT

There is provided a novel method for increasing sucrose yield in sugar cane by treating sugar cane a few weeks prior to harvest with a polyalkylene glycol ester of $\alpha$-hydroxy, $\beta,\beta,\beta$-trichloroethanephosphonic acid.

5 Claims, No Drawings

PROCESS FOR INCREASING SUGAR YIELD IN SUGAR CANE

The present invention relates to a novel method for increasing the sucrose yield of sugar cane by applying thereto an effective amount of a polyalkylene glycol ester or mixture of esters of α-hydroxy β,β,β-trichloroethanephosphonic acid having the formula:

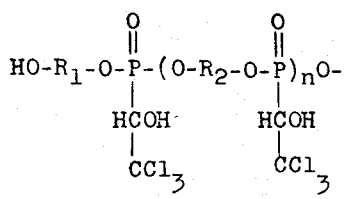 or 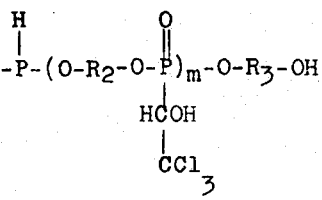

wherein $R_1$, $R_2$ and $R_3$ are residues of polyalkylene glycol from each of which the two hydroxyl groups have been removed, $n$ is an integer from 0 to 3 and $m$ is an integer of 1 to 3, or higher.

It is known that sugar yields can be increased by modifying the physiological process of sugar cane. However, none of the presently employed quaternary amines or ammonium halides as exemplified in U.S. Pat. Nos. 3,493,361 and 3,660,072 is entirely satisfactory as enhancing increased yields. If a class of compounds could be provided which would enhance yield activity of sugar cane, such would fulfill a long felt need in the art.

According to the process of the invention, it has been found that certain polyalkylene glycol esters of alphahydroxy beta, beta, beta-trichloroethanephosphosphonic acid are unexpectedly highly effective for increasing sucrose yield in field grown sugar cane, particularly when they are applied to the younger growing parts of the ripening cane stalks about two to ten weeks before harvest.

The phosphonates employed in the practice of the instant invention are known. These are defined with particularly in the patent to Friedman, U.S. Pat. No. 3,131,206 issued on Apr. 28, 1964 which is incorporated by reference herein. Illustrative of the useful compounds are: phosphonic acid, (2,2,2-trichloro-1-hydroxyethyl)-bis-[2-(2-hydroxypropoxy)-1-methylethyl] ester; phosphonic acid, (2,2,2-trichloro-1-hydroxyethyl)-bis-[2-(2-hydroxyethyoxy) ethyl] ester; phosphonic acid, (2,2,2-trichloro-1-hydroxyethyl)-, 2-(2-hydroxypropoxy)-1-methylethyl ester, diester with 1,1′-oxydi-2-propanol; phosphonic acid, (2,2,2-trichloro-1-hydroxyethyl)-, 2-(2-hydroxyethoxy) ethyl ester, diester with diethylene glycol; and a compound selected from the group consisting of:

1. tris-polyethylene glycol bis-α-hydroxy-β,β,β-trichloroethane diphosphonate having the structure:

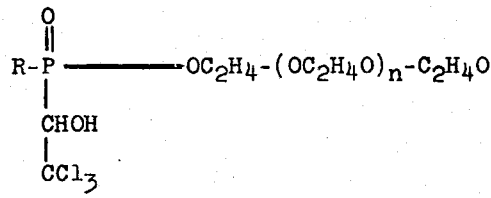-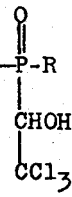

where R is $-OC_2H_4-(OC_2H_4O)_n$, $-C_2H_4OH$ and $n$ and $n'$ each represent an integer from 0, 1, 2 or 3;

2. bis-polypropylene glycol α-hydroxy-β,β,β-trichloroethanephosphonate having the structure:

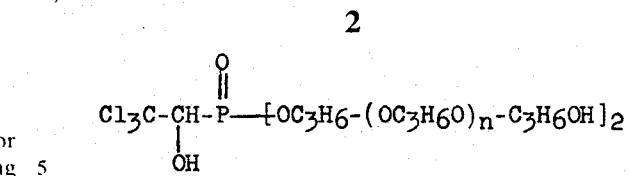

where $n$ is an integer from 0 to 3; and 3. tris-polypropylene glycol bis-α-hydroxy-β,β,β-trichloroethane-diphosphonate having the structure:

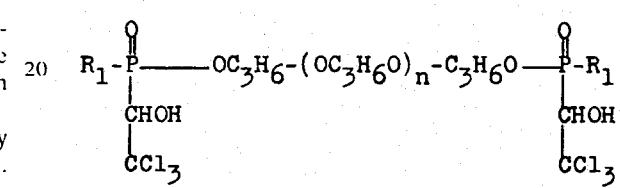

where $R_1$ is $-OC_3H_6-(OC_3H_6O)_{n'}$, $-C_3H_6OH$ and $n$ and $n'$ each represent an integer from 0 to 3; and mixtures thereof.

The active phosphonate or phosphonate mixture is preferably applied to cane stalks as a liquid spray, i.e., an aqueous solution or suspension prepared from a wettable powder or emulsifiable concentrate, in an amount sufficient to provide from about 1.0 pound per acre to 8.0 pounds per acre of the active phosphonate. However, since the phosphonates employed in the process of this invention are generally viscous liquids, they may also be applied to cane stalks either as neat or dissolved in a small amount of solvent utilizing the ultra low volume or low volume technique of application. In ultra low volume applications, the phosphonate is applied as the technical material in the form of discreet droplets having a mass median diameter between 25 and 150 microns. Low volume application is similar to ultra low volume application excepting that the active phosphonate is dissolved in a minor amount, generally from about 5% to about 50% by volume, of a relatively nonvolatile solvent, such as xylene, Panasol AN-2, Esso HAN, or Light Cycle oil, and is applied as such in the form of discreet droplets having a mass median diameter of 25 to 150 l microns. Advantageously, the phosphonates employed in the process of the present invention can also be applied as aerosols or fogs using conventional formulations and equipment.

In general, wettable powders are prepared by dissolving the phosphonate in a volatile solvent, such as acetone or methylene chloride, and spraying the thus formed solution on a finely divided carrier such as attaclay, kaolin, talc, or diatomaceous earth and admixing therewith from about 1% to 10% by weight of a surfactant. A small amount of a dispersing agent, such as sodium lignosulfonate, may also be added. Surfactants which may be used include: polyoxyethylene sorbitan fatty acid esters, polyoxyethylene sorbitol esters and alkyl phenoxy polyoxyethylene ethanol. It is a good practice to disperse the aforementioned wettable powder in water and then apply the same to sugar cane stalks in an amount sufficient to provide from about 0.5 pound to about 8.0 pounds per acre of the phosphonate.

An alternative manner in which to utilize the active compounds of the present invention is as an emulsifiable concentrate. This is about 25% to 40% by weight of the phosphonate in about 50% to 65% by weight of a solvent, such as xylene and admixing therewith about 5% to 10% by weight of an emulsifier, such as a polyoxyethylated nonylphenol or a polyoxyethylene derivative of an aliphatic or aromatic hydroxy compound. The thus prepared concentrate is then generally dispersed in water for application as a liquid spray.

The present invention will be further illustrated, but not limited, by the following example. Unless otherwise stated, the parts are by weight.

EXAMPLE 1

The following procedure is used to determine the efficacy of test compounds for increasing sucrose yield in sugar cane.

An acetone:water (1:1) solution of the active ingredient is applied to 10 field grown sugar cane plants at a rate equivalent to 4 pounds per acre. At 4 weeks (1st Harvest) and 5 weeks (2nd Harvest) after application of the compound designated in the table below, 5 of the plants are harvested, aggregated and a random sample removed for sugar analysis. The analytical methods for sugar content determination have been published. See, for instance, Tanimoto, *The Press Method of Cane Analysis*, Hawaiian Planters; Record 57(2):133 (1964). The data is presented in Table 1 below.

Similar results are obtained when phosphonic acid, (2,2,2-trichloro-1-hydroxyethyl)-bis-[2-(2-hydroxyethoxy) ethyl] ester; phosphonic acid, (2,2,2-trichloro-1-hydroxyethyl)-, 2-(2-hydroxypropoxy)-1-methylethyl ester, diester with 1,1'-oxydi-2-propanol; or phosphonic acid, (2,2,2-trichloro-1-hydroxyethyl)-, 2-(2-hydroxyethoxy) ethyl ester, diester with diethylene glycol, is applied to field grown sugar cane at a rate equivalent to 4 pounds per acre 5 to 8 weeks before harvest.

I claim:

1. A method for increasing sugar yield in field grown, ripening sugar cane comprising the step of: applying to said sugar cane about 2 to 10 weeks prior to harvest at a rate equivalent to form about 1 pound per acre to about 10 pounds per acre of the compound:
   a. phosphonic acid, (2,2,2-trichloro-1-hydroxyethyl)-bis-[2-(2-hydroxypropoxy)-1-methylethyl] ester;
   b. phosphonic acid, (2,2,2-trichloro-1-hydroxyethyl)-bis-[2-(2-hydroxyethoxy)ethyl] ester;
   c. phosphonic acid, (2,2,2-trichloro-1-hydroxyethyl)-,2-(2-hydroxypropoxy)-1-methylethyl ester, diester with 1,1'-oxydi-2-propanol; or
   d. phoshonic acid, (2,2,2-trichloro-1-hydroxyethyl)-, 2-(2-hydroxyethoxy)ethyl ester, diester with diethylene glycol.

2. The method according to claim 1 wherein the compound is phosphonic acid, (2,2,2-trichloro-1-hydroxyethyl)-bis-[2-(2-hydroxypropoxy)-1-methylethyl] ester.

3. The method according to claim 1 wherein the compound is phosphonic acid, (2,2,2-trichloro-1-hydroxyethyl)-bis-[2-(2-hydroxyethoxy) ethyl] ester.

TABLE 1

| Compound | 1st Harvest | | 2nd Harvest | |
|---|---|---|---|---|
| | pol% cane | juice purity | pol% cane | juice purity |
| $(HO-CHCH_2-O-CH_2CH-O)_2-P(=O)-CHCCl_3$, with $CH_3$, $CH_3$, $OH$ substituents | -- | -- | 10.0 | 78.1 |
| Untreated Control | -- | -- | 6.2 | 65.5 |
| $(HO-CHCH_2-O-CH_2-CH-O)_2-P(=O)-CHCCl_3$, with $CH_3$, $CH_3$, $OH$ substituents | 12.33 | 81.29 | 11.65 | 74.64 |
| Untreated Control | 9.16 | 75.34 | 9.65 | 78.61 |

In the above table "pol% cane" is a polarimetric determination and equals the percentage of sucrose, if it is the only substance in the solution which will rotate the plane of polarized light. The determination of "pol% cane" is a standard method for determining sucrose content of sugar cane and is accepted by the industry.

From the data provided above, it can be seen that the test compound, representative of its class as described above, is highly effective for increasing sucrose yield in sugar cane.

4. The method according to claim 1 wherein the compound is phosphonic acid, (2,2,2-trichloro-1-hydroxyethyl)-, 2-(2-hydroxypropoxy)-1-methylethyl ester, diester with 1,1'-oxydi-2-propanol.

5. The method according to claim 1 wherein the compound is phosphonic acid, (2,2,2-trichloro-1-hydroxyethyl)-, 2-(2-hydroxyethoxy)ethyl ethyl ester, diester with diethylene glycol.